2,751,039

FILTERS COATED WITH THICKENED OILS

Fred J. Hanly, Berkeley, Calif., assignor to California Research Corporation, San Francisco, Calif., a corporation of Delaware No Drawing. Application December 23, 1952, Serial No. 327,697

6 Claims. (Cl. 183—44)

This invention pertains to filter materials coated with certain thickened hydrocarbon oils.

Impingement-type air filters are useful in numerous instances to remove undesirable particles from the air. It is a primary function of air filters to entrap dust particles and other foreign solid bodies present in the air, to remove such particles before the air is used. Such air filters are useful in various industrial installations (e. g., pharmaceutical laboratories), in railroad diesel engines, in office buildings, in homes, in automotive equipment, etc. In railroad diesel engines, for example, it is essential that the breathers on the diesel engines suck in air which is substantially free of all foreign matter in order to prevent damage to the various moving parts within the engine, such as scoring of cylinders, etc.

Filter elements normally have the surface of the structural permeable mass wetted with oil films to improve the dust-catching ability of the filter units. The dust particles impinge upon the oil surface; the oil film wets the dust particles and holds these particles, preventing their passage through the filter unit. The oils which heretofore have been used to produce the surface film have been fluids which have a tendency to flow from the material serving as the structural unit of the filter, leaving just the bare filter material, which of itself is quite inefficient in continually removing dust particles from air streams. The dry fibers or bare wire screens do not retain dust particles. Such oils are lost too soon, and must be continually replaced. Furthermore, when oils flow freely, the filter units require a means of "picking up" the oil flowing from the filter units, unnecessarily hampering filtering operations.

In attempting to avoid the disadvantages of a filter element having a surface oil film which flows too freely and leaves dry fibers or wire screens, certain thickening agents, such as polybutenes have been incorporated into the oil film of the filter element. Although such oil films are thickened and have the appearance of "tackiness," this apparent tackiness is evident only at high flow rates, and it contributes little, if any, improvement in retention or dust-collecting power to the filter element. When the polybutene concentration in the oil film is sufficient to increase the viscosity appreciably, the retention of the oil film may be improved. However, this improvement is for only a relatively short period of time, and even then, leakage is still excessive because the oil film continues to flow off the filter element until only a thin, ineffective film held by surface forces only, is present.

It has now been discovered that greatly superior dust-catching and dust-retention efficiency is obtained with a filter element of permeable structural mass coated with a material having high "adhesiveness" and high "wicking."

As used herein, the term "adhesiveness" means the resistance of the coating to flow under mild forces imposed by gravity. Thus, the coatings on the filter material of the present invention are to be contrasted to films of oils heretofore employed. Oils which have been used, including polybutene-thickened oils, exhibit true Newtonian fluid properties, that is, freely flowing under the force of gravity or other mild external force.

The term "wicking" means that property of the coating of the filter material to continually wet the dust particles collecting on the coating surface. Thus, when dust impinges on a filter surface, there is a tendency to build up superimposed layers of dust. The faster an oil of a filter coating wets the dust particles and passes through that dust layer to present a new filter-oil surface for catching new dust particles, the greater is the wicking tendency.

With prior filter elements, when the viscosity of the oil film was sufficiently high to give the adhesiveness necessary to maintain itself on the filter material for an appreciable time, the viscosity of such an oil film was too high for adequate wicking.

According to the present invention, the above-described features of high adhesiveness and high wicking, which features were heretofore believed to be antagonistic and not attainable in a single filter material, are obtained simultaneously in an improved impingement-type filter element embodying on a permeable structural mass a coating of a base oil having certain polymeric compounds incorporated therein.

These improved filter materials have a greater capacity for dust, that is, they are more effective in removing dust particles from air passing through the filter element than heretofore believed possible. This means that a greater amount of dust will be collected by the new filter elements. Consequently, the period between replacement or reactivation will be longer as compared to filter elements heretofore proposed. In some cases, the amount of dust withdrawn from the air and retained on the new filter element is 200% or more by weight than that possible for the older filter elements. Furthermore, the improved filter elements maintain a sustained efficiency of dust-entrapment throughout the period of use.

In previously-used filter elements, the filter coating was susceptible to removal by water during washing operations and during periods of rain. However, the present filter materials are coated with oils which are water-resistant, permitting water to impinge upon the filter material without necessarily impairing the efficiency of the filter materials.

The polymeric compounds contemplated in the present invention are polymeric ethers and esters, the monomers of which are represented by the following formula:

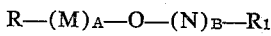

wherein R is a hydrocarbon radical having polymerizable ethylenic linkage and containing from 2 to 8 carbon atoms, $R_1$ is a saturated or unsaturated, cyclic or acyclic straight or branched-chain, substantially hydrocarbonaceous radical containing from 4 to 12 carbon atoms, M and N each represent a carbonyl group

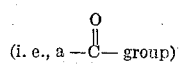

and A and B are whole numbers, the sum of which has a value of zero or 1. When A and B are both zero, the above formula becomes R—O—$R_1$.

It is preferred that R of the above formula is a hydrocarbon radical having a polymerizable ethylenic linkage containing from 2 to 4 carbon atoms, and that R' is a straight or branched-chain, substantially hydrocarbonaceous radical having from 4 to 8 carbon atoms.

By "substantially hydrocarbonaceous" radical is meant those radicals which are composed mainly of hydrogen and carbon, and include such radicals which contain, in addition, minor amounts of substituents such as chlorine, bromine, oxygen, hydroxyl groups, etc.

Examples of R include the radicals derived from vinyl alcohol, propenol-1, allyl alcohol, methallyl alcohol, methylvinylcarbinol, 3-methylbuten-1-ol-3, hepten-1-ol-3, 4,4′-dimethyl-pentene-1-ol-3, crotyl alcohol, allylcarbinol, etc.

Examples of $R_1$ include the following radicals: butyl, butenyl, pentyl, decyl, dodecyl, cyclohexyl, cyclohexenyl, phenyl, etc.

Examples of monomeric units which are polymerizable to form the polymeric compounds useful in the filter elements of this invention include the following ethers and esters: vinyl n-butyl ether, vinyl isobutyl ether, vinyl isoamyl ether, vinyl n-hexyl ether, vinyl 2-ethylhexyl ether, vinyl trimethyl nonyl ether, vinyl decyl ether, vinyl dodecyl ether, allyl hexyl ether, allyl octyl ether, allyl dodecyl ether, methallyl decyl ether, methallyl cyclohexyl ether, propenyl butyl ether, propenyl 2-ethylhexyl ether, propenyl decyl ether, isopropenyl decyl ether, vinyl butyl phenyl ether, octenyl 2-ethylhexyl ether, octenyl butyl ether, etc.; butyl acrylate, pentyl acrylate, n-octyl acrylate, 2-ethylhexyl acrylate, nonyl acrylate, trimethyl butyl acrylate, decyl acrylate, n-octyl methacrylate, decyl methacrylate, dodecyl methacrylate, isobutyl vinyl acetate, n-pentyl vinyl acetate, 2-ethylhexyl vinyl acetate, decyl vinyl acetate, dodecyl vinyl acetate, butyl ethylacrylate, hexyl ethyl acrylate, n-octyl ethyl acrylate, decyl ethyl acrylate, dodecyl ethyl acrylate, vinyl butyrate, vinyl n-valerate, vinyl caproate, vinyl 2-ethyl butyrate, vinyl caprylate, vinyl laurate, allyl 2,2-dimethyl butyrate, allyl tertiary-butyrate, allyl caproate, allyl pelargonate, allyl caprylate, allyl laurate, methallyl butyrate, methallyl caproate, methyl methallyl caprylate, crotyl butyrate, crotyl caprylate, crotyl laurate, octenyl butyrate, octenyl 2-ethyl butyrate, octenyl caproate, octenyl caprylate, octenyl laurate, etc.

Other suitable polymeric esters and ethers are esters and ethers of polysaccharides (e. g., cellulose monooleate, cellulose dioleate, cellulose butyl ether, starch monooleate), and esters and ethers of polyalkylene glycols (e. g., polyethylene 2-ethylhexyl octanoate), etc.

The monomers set forth hereinabove form high molecular weight polymeric compounds. For the purposes of this invention, the polymeric compounds have molecular weights ranging from 4,000 to 40,000. It is preferred to use polymers having molecular weights of about 10,000 to about 20,000.

The polymeric compounds set forth herein are used in amounts sufficient to thicken the base oils to the consistency desired for the filter oils. That is, the amounts of polymeric compounds used are sufficient to obtain adequate thickening of the oil to obtain desired adhesiveness, yet amounts which are less than that which interferes with the wicking tendency. Such amounts of polymeric compounds in filter oils are from about 0.5% by weight to about 10% by weight. It is preferred to use the polymeric compounds in amounts of from about 3% to about 5%.

Unlike the oil-soluble polymers, such as polyvinyl stearates, the polymers of this invention are substantially insoluble in the base oil at temperatures below about 190° F. However, they may be dissolved in oil with the aid of heat and, once dissolved, they remain suspended even after the oil is cooled below the dissolution temperature. However, the cooled suspension is no longer a true fluid, because it contains a network which gives it a semirigid structure and prevents it from flowing under low shear stresses, and thus greatly improves its retention on a filter element as compared with a true fluid. At the same time, if the polymer-oil suspension is made up from an oil of moderate viscosity, the oil readily extrudes through a layer of dust collected on the surface to catch additional layers of dust.

Base oils which are combined with the polymeric compounds to form the coating in the filter elements include a wide variety of hydrocarbon lubricating oils (i. e., hydrocarbon oils of lubricating viscosity) such as naphthenic base, paraffin base and mixed base mineral oils, other hydrocarbon lubricants, e. g., lubricating oils derived from coal and synthetic oils, e. g., alkylene polymers (such as polymers of propylene, butylene, etc., and mixtures of polymeric olefins), alkyl benzene polymers, etc.

As used herein, the terms "filter material" and "permeable structural mass" refer to materials to which the polymer-containing oil coatings adhere and which, when so coated, permit the passage of air without appreciable channeling. It is essential that the air follows a tortuous path to multiply the contacts which the air has with the oily coated surfaces. It is readily understood that the presence of an oily coating upon filter materials impedes the flow of air somewhat. However, the amount of such impedance is not necessarily constant and may be varied according to the use to which the filter is put. For example, on a railroad diesel engine, because of the large amount of air used, it becomes essential that the pressure drop across the filter be as low as possible. On the other hand, when a filter unit is used to filter air going into a residence, the pressure drop across the filter unit is of no great consequence because of the relatively small amount of air which may pass through the filter.

Thus, the filter materials and the shapes of such materials, as well as the amount of coating applied, are selected so that the pressure drop across the filter element is not excessive for any particular service. Furthermore, depending upon the type and shape of materials and the structural mass derived therefrom, the amount of polymer-containing base oil applied is less than that which causes an appreciable "webbing over" or plugging of holes or air spaces, but is at least sufficient to form a coating over a majority of the surface area of the structural mass.

Examples of filter materials having the above characteristics include wire meshes, fibers, particles of various kinds, etc., prepared from glass, limestone, bituminous substances, plastic materials, plastic fibers, plant substances, animal substances, ceramic substances, wood, rubber, etc. These wire meshes and fibers can be convoluted and the particles arranged into a permeable structural mass in such a way as to force the air to follow a tortuous path through the filter element. The filter materials can be so arranged (supported) in a framework (a cartridge) in a manner to form a unit which may be readily removed as such for convenient renewal or regeneration of the coated filter material.

The superiority of the improved filter elements of the present invention is illustrated by the following examples.

EXAMPLE 1

Polyethylene glycol having an average molecular weight of 4000 was esterified with oleic acid to form the dioleate. This polymeric ester was incorporated in an amount of 5% by weight in a California solvent-refined naphthenic base lubricating oil having a viscosity of 450 SSU at 100° F. The resulting thickened oil was heated to 190° F. and into this a weighed wire screen was dipped. The excess oil was allowed to drain freely from the screen at room temperature during the next 24 hours, after which the screen was weighed. The amount of the oily coating retained on the screen was 100% more by weight than for the unthickened base oil applied in the same manner.

When the amount of polyethylene glycol dioleate in the base oil was increased to 10%, the amount of oily coating retained on the filter was 200% greater than that for the uncompounded base oil.

Table I hereinbelow presents further data obtained in retention test with the same base oil as in the above example thickened with other polymeric esters and ethers.

Table I
OIL RETENTION TEST DATA

| Test No. | Polymer Used | Amt. of Polymer in Thickened Oil (Wt. Percent) | Wt. Gain for Filter Element (Wt. Percent) | Percent Gain Over Base Oil |
|---|---|---|---|---|
| 1 | | | 7.0 | |
| 2 | Poly(isobutyl Methacrylate) | 3 | 52.0 | 640 |
| 3 | Cellulose Dioleate | 5 | 14.8 | 110 |
| 4 | Cellulose Monooleate | 4 | 13.9 | 99 |

The following examples illustrate the viscosity characteristics of the thickened oils employed for the oily coating in the filter elements of this invention.

EXAMPLE 2

A mixture of 5% ethyl cellulose and 3% aluminum stearate was incorporated in a California solvent-refined naphthenic base oil having a viscosity of 1000 SSU at 100° F. The mixture was a soft, unctuous grease which melted to a high viscosity liquid having a viscosity of 60,000 SSU at 210° F.

EXAMPLE 3

When 3% of a polymeric glycol fatty acid ester was incorporated in a California solvent-refined, naphthenic base oil having a viscosity of 450 SSU at 100° F., a soft, unctuous gel was obtained. Above 100° F., this product had a viscosity of 52.4 SSU at 210° F.

A characteristic of the coatings in the filter elements described herein is their resistance to emulsification in water. Water resistance is generally recognized as a service requirement of filter elements and it is normally essential that the oily coating will not be removed by accidental contact with water. When the filter materials are made from a metal, such resistance to emulsification in water also inhibits rusting of the filter material.

In addition to the polymer compounds set forth herein, the coating in the filter elements can contain oxidation inhibitors (e. g., selenides, sulfides, etc.), oiliness agents (e. g., fatty acids), other thickening agents (e. g., amides, soaps, polyethylene, etc.), color correctors, dispersants (e. g., metal sulfonates, polymeric glycols, etc.) corrosion inhibitors, rust inhibitors, wetting agents, etc.

I claim:

1. An impingement type air filter of improved adhesiveness and wicking characteristics comprising a permeable structural mass wetted with a composition consisting essentially of a hydrocarbon oil of lubricating viscosity and from about .5 to about 10% by weight of a compound selected from the group consisting of the cellulose oleates and a polymeric compound having a molecular weight of from about 4,000 to about 20,000, said polymeric compound being derived from a monomer having the formula

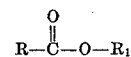

$$R-\overset{O}{\underset{\|}{C}}-O-R_1$$

wherein R is an aliphatic hydrocarbon radical having an ethylenic linkage and from 2 to 8 carbon atoms and $R_1$ is an alkyl radical having from 4 to 12 carbon atoms, said composition being a Newtonian fluid at temperatures above about 190° F. and a non-Newtonian, semi-rigid mass at room temperature, said polymeric compound at room temperature being insoluble in the oil and being uniformly suspended therein.

2. A filter according to claim 1 wherein $R_1$ of the structural formula is an alkyl radical having from 4 to 8 carbon atoms.

3. A filter according to claim 1 in which R of the structural formula is an ethylene radical.

4. A filter according to claim 1 wherein the polymeric compound is an alkyl methacrylic ester, the alkyl group of which has from 4 to 12 carbon atoms.

5. A filter according to claim 1 wherein the polymeric compound is polyisobutyl methacrylate.

6. A filter according to claim 1 wherein the polymeric compound is a cellulose oleate.

References Cited in the file of this patent

UNITED STATES PATENTS

| | | |
|---|---|---|
| 2,091,627 | Bruson | Aug. 31, 1937 |
| 2,145,898 | Simpson | Feb. 7, 1939 |
| 2,330,773 | Zimmer et al. | Sept. 28, 1943 |
| 2,353,937 | Smith | July 18, 1944 |
| 2,407,954 | Fenske | Sept. 17, 1946 |
| 2,431,008 | Wright | Nov. 18, 1947 |
| 2,568,144 | Cremer et al. | Sept. 18, 1951 |
| 2,627,938 | Frohmader et al. | Feb. 10, 1953 |
| 2,691,646 | Young et al. | Oct. 12, 1954 |